United States Patent [19]

Umberson

[11] Patent Number: 4,720,929
[45] Date of Patent: Jan. 26, 1988

[54] TRENCHING DEVICE

[75] Inventor: Gerald E. Umberson, Alta Loma, Calif.

[73] Assignee: Capitol Trencher Corporation, San Dimas, Calif.

[21] Appl. No.: 829,779

[22] Filed: Feb. 14, 1986

[51] Int. Cl.⁴ ............................................. E02F 5/08
[52] U.S. Cl. ..................... 37/91; 37/DIG. 17; 74/337; 192/0.034; 192/70.12
[58] Field of Search ..................... 37/91–97, 37/190, 191 R, 191 A, 192 R, 69, DIG. 1, DIG. 7, DIG. 17; 192/70.12, 0.032, 0.034, 50 R, 3.52, 107 C, 129 R, 150; 74/337; 173/25–27

[56] References Cited

U.S. PATENT DOCUMENTS

| | | | |
|---|---|---|---|
| 2,084,887 | 6/1937 | Bennett | 37/DIG. 17 |
| 2,708,800 | 5/1955 | Logus | 37/DIG. 17 |
| 2,894,341 | 7/1959 | Amthor | 37/DIG. 7 |
| 3,251,439 | 5/1966 | Randol | 192/0.032 |
| 3,945,138 | 3/1976 | Heusler et al. | 37/DIG. 1 |
| 3,970,154 | 7/1976 | Bartels | 37/DIG. 17 |
| 4,458,793 | 7/1984 | Riese et al. | 192/70.12 |
| 4,488,626 | 12/1984 | Handke | 192/70.12 |
| 4,516,655 | 5/1985 | Donahue et al. | 37/DIG. 17 |
| 4,529,073 | 7/1985 | Lewis | 192/70.12 X |
| 4,574,926 | 3/1986 | Bubak | 192/70.12 X |

Primary Examiner—E. H. Eickholt
Attorney, Agent, or Firm—Lyon & Lyon

[57] ABSTRACT

An improved torsional limiting device and associated control system are incorporated in a large scale trencher between the power source and the cutting wheel to provide for protection of the equipment components in the event the cutting wheel encounters unforeseen obstructions. The control system provides for prompt and variable adjustment by the operator of the amount of torque transmitted to downstream components and also provides for the prompt and easy resumption of the trenching operation after an obstruction has been encountered.

10 Claims, 6 Drawing Figures

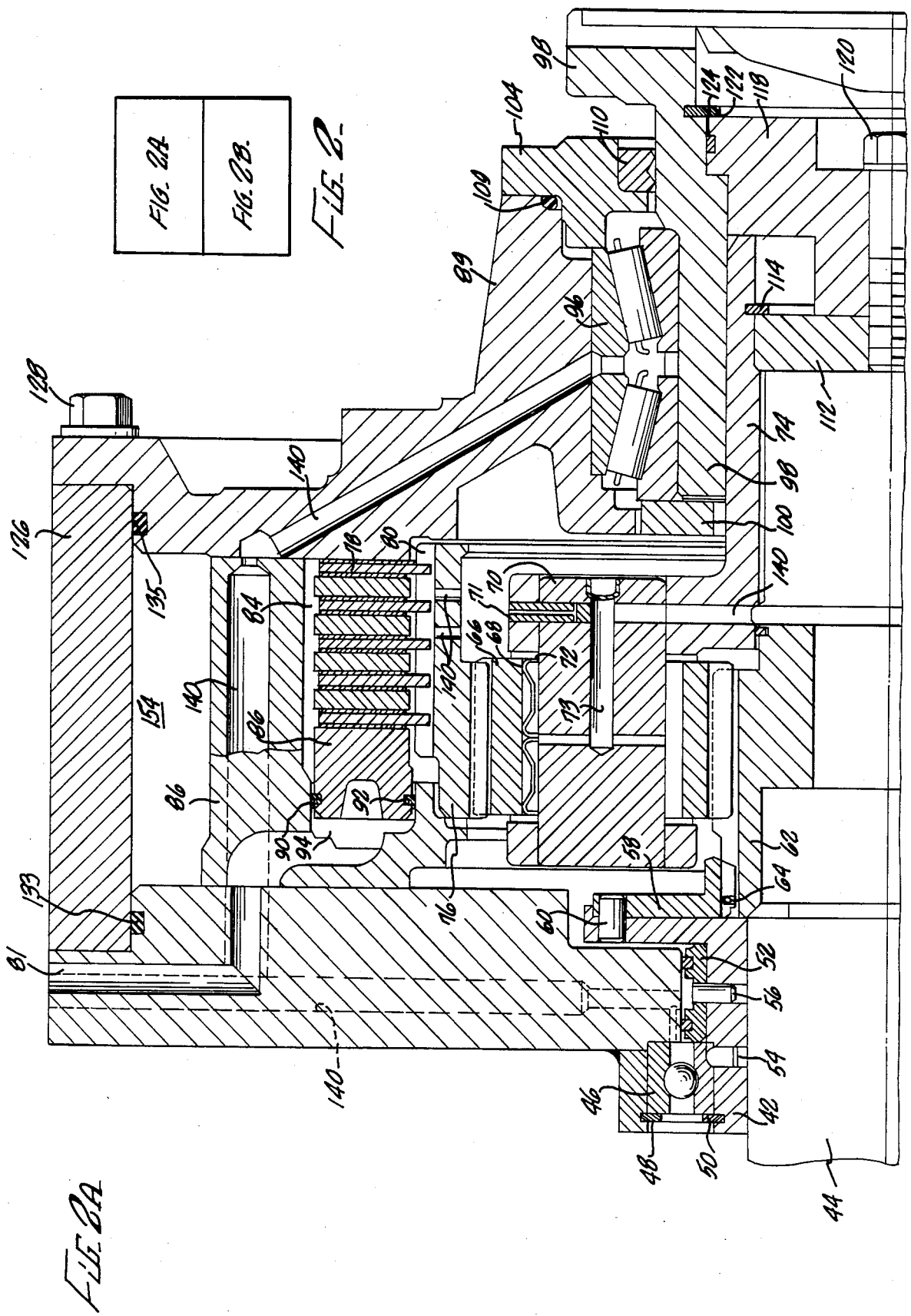

TRENCHING DEVICE

BACKGROUND

1. Field of the Invention

This invention pertains to trenchers, that is, motorized devices for digging trenches up to ten feet or more deep, and six feet or more wide, at a single pass. Specifically, this invention pertains to improvements in the transmission and control of power to the cutting wheel and the tracks of the trencher.

2. Prior Art

The earliest trenching devices were undoubtedly the human hand, as man dug for food. Later, sharp sticks or rocks tied to sticks were used to cultivate the ground, transport water, or lay a trap for prey. Since then, however, the art of ditch digging has advanced considerably.

Today, for aesthetic, safety and other reasons, cables, power lines and pipes are laid underground, often spanning tremendous distances. Similarly, the depth and width of trenches necessary to accommodate the size pipes and other apparatus being laid in the ground can reach ten or more feet deep, and six or more feet wide. Further, the geological formations through which these trenches must be dug can range from soft loam to rock harder than concrete.

In any pipe laying project, the digging of the trench can be the most costly component in terms of money and time, as the pipe or cable can usually be laid as fast as the trench is dug. Therefore, increasing the speed of the trenching operation substantially lessens the cost of the overall project. Also, because these trenches will often traverse scenic areas, it is important that the trenching operation minimize its impact up the area as much as possible.

All of these factors have led to the development of the modern-day trenching machines. These devices are typically heavy duty industrial vehicles (such as wheeled or tracked vehicles) to which a rotating cutting wheel is appended. In some trenchers, the cutting wheel is elongated, resembling the blade of a chain saw. The cutting wheel is equipped with a number of buckets about its outer periphery, with each of the buckets having a number of cutting teeth. As the cutting wheel is rotated, the teeth cut into the ground, filling each of the individual buckets with the cut material. The buckets carry the material out of the trench and deposit their load onto a running conveyor belt which transports the material to the side of the trench. As the cutting wheel rotates, the vehicle travels ahead as fast as the material can be cut and removed from the trench.

In the trenching operation, the operator of the trencher has control over two essential variables. The first is the speed at which the trencher is set to move forward. The typical large scale trencher is equipped with a pair of tracks which have independent controls called "crowd handles". The operator, of course, wants the maximum forward speed which can be obtained. This will depend upon the terrain to be traversed and the material to be trenched. The appropriate setting on the crowd handles is arrived at through trial and error. Once set at an optimum position, the operator prefers not to change the setting. The second variable is the amount of torque delivered to the cutting wheel. Again, the operator strives for an optimal setting wherein the torque is sufficiently high such that the cutting wheel will not be stopped upon encountering every obstruction, but not so high, that when a truly immoveable obstruction is encountered, which does stop the cutting wheel, damage will result to the downstream components.

As might be expected, considerable power must be transmitted to the cutting wheel to rotate it with sufficient force to cut properly. This is not a problem, however, as a sufficiently large engine can be provided for that purpose. A problem does arise, however, due to the fact that notwithstanding the tremendous force which can be transmitted to the cutting wheel due to the reduction from the 2150 RPM at which the engine is turning to the 8 to 11 RPM at which the cutting wheel in turning and the large momentum which the cutting wheel generates during the digging operation, different geological formations of varying hardness, or large rocks not visible to the operator, will be encountered. The trencher may not be able to cut its way through these formations at the speed encountered. Indeed, it is not at all unusual for a cutting wheel, ten feet in diameter, 3 feet wide and weighing 35,000 pounds to be instantaneously stopped because of some unseen obstruction in the ground. Accordingly, a direct connection between power source and cutting wheel is not possible. Some means must be provided which will allow for slippage in that situation, otherwise catastrophic damage to the equipment will result due to the large overall reduction and the multiplication of torque. Moreover, the loss so occasioned will be far in excess of the damage to the equipment, because "down time" results in virtual stoppage of the trenching project.

A number of solutions have been proposed for this problem. For example, a belt drive mechanism has been used. This has not proven as satisfactory as desired, because belts require frequent replacement, particularly when they become burnt when the cutting wheel unexpectedly is stopped as described above. Further, belts are difficult to tension properly.

Another device utilized has been ordinary pneumatic tires, one on either side of the cutting wheel. The tires are rotated much the same as in an automobile, and are brought against the cutting wheel under pressure. This mechanism is a substantial improvement over belt drive, but still does not work as well as desired because sufficient tensioning may not be possible and, as with the belt system, tensioning is also difficult.

Another device previously utilized as a tortional limiting means in large scale trenchers is the twin disk over-center clutch. In this device, power is transmitted to downstream components by virtue of two or more dry clutch plates which act upon one another frictionally. The clutch plates are brought together by means of an over center toggle arrangement which includes a fine thread adjusting collar. Typically, this type of device, when used in a large scale trencher, has multiple disks and is located immediately aft of the digging transmission. As a result, the tortional requirements of the device are quite high and require substantial friction. Still, the intent of the device is to limit the amount of torque which can be transmitted to downstream components, so a proper setting of the adjusting collar is critical to the proper functioning of this device. This device, however, has no means for measuring the resulting friction achieved at any particular setting of the adjusting collar. Only an experienced operator, who has developed a "feel" for the device, can be expected to consistently adjust the device properly. It is not unusual for an inexperienced operator to tighten the adjusting collar too much, resulting in catastrophic failure of downstream components. Even experienced operators have failed to properly set this device.

In addition to the difficulties encountered in properly adjusting this device, another inherent drawback arises when the cutting wheel encounters an obstruction which causes the clutch plates to turn relative to one another; that is, changing from a static to a dynamic state. When this occurs, two things happen. First, the coefficient of friction of the materials used on most clutch plates increases in the dynamic state. Therefore, the clutch plates, which are supposed to slip when the cutting wheel encounters an immoveable object, actually work against that purpose. Second, when the plates obtain a dynamic state, the plates become very hot very quickly. That heat not only causes the plates to expand, but also causes the toggle mechanism and adjustment collar to become hot and expand, all of which tend to increase the amount of friction between the plates.

The operator must immediately release the clutch mechanism so that the clutch plates no longer act on one another. Once the obstruction has been cleared, however, this prior art device will not permit for the clutch to be reengaged at the same adjusting collar position, as the prior collar setting is no longer correct. This is as a result of latent heat which is stored in the plates and surrounding metal components, and the loss of friction material from the plates. (The friction material is typically asbestos, which is an excellent heat insulator, which increases the problems associated with heat retention). Therefore, before digging again, the operator must manually change the setting of the adjustment collar. That new setting in turn becomes imprecise as the components cool. In the event more obstructions are encountered before the system cools, (which is the usual situation), heat build-up occurs which can result in warped and damaged plates.

Another prior art device was an oil drive mechanism. Because of the problems associated with the dry twin disk over-center clutch mechanism, some people in the field have turned to a hydraulic system for power transmission, relying on release valves to protect the downstream components in the event the cutting wheel hits some immovable obstruction. This system, however, is subject to three drawbacks. First, the system is sensitive to hydraulic oil contamination. As might be imagined, the trenching operation is typically a very dusty, dirty environment. Therefore, the chances of contamination are enhanced greatly. Second, on large scale equipment, the system becomes quite complex with as many as four pumps, four motors and associated components necessary to transmit the desired power. The failure at any point of this complex system is a failure of the entire system. Because of its complexity, any failure is extremely time consuming because of the difficulty in diagnosis, and the extensive nature of repairs. Often, hydraulic repairs can not be effected in the field, and require that the components be returned to the shop. Moreover, any repairs in the field entail opening the system to the harsh environment, leading to further contamination and further failures.

Thirdly, the hydraulic system was undesirable because of the large horse power loss associated with the system, problems of heat generation, and problems with cavitation in the pumps following release of the relief valves.

The prior art devices have also not provided for immediate release when an obstruction which causes the cutting wheel to stop is encountered. Even though the devices may slip as designed, the slippage still places a tremendously increased load on the downstream drive train. Unless immediately released, damage may occur. At a minimum, this increases wear and tear on the other components, leading to more frequent repair. In the past, with prior art devices, equipment failure once a week or more is not unusual.

Therefore, a need exists in the field of large scale trenching equipment for an improved trencher which will overcome the deficiencies of the prior art.

SUMMARY OF THE INVENTION

This invention provides such an improved trencher by incorporating a novel system for the transmission and limiting of torque to the cutting wheel, for adjustment of the tortional setting of the system, for protection of the drive train in the event the cutting wheel encounters an immoveable obstruction, and for neutralizing the forward motion of the tracks of the trencher when an immoveable obstruction is encountered.

At the heart of the system is a plantary ring clutch mechanism having friction discs and reaction plates used as a tortional limiting device. Traditionally, clutches are designed to grab and hold unless completely released. On the other hand, brake mechanisms are designed for slippage. In other words, in the traditional clutch mechanism, the material on the clutch plates is designed such that the coefficient of friction increases in the dynamic state; whereas, in the traditional brake mechanism, the brake pads are equipped with a material designed to have a reduced coefficient of friction in the dynamic state, compared with the static state. In this invention, the friction discs are equipped with a material providing for reduced coefficient of friction in a dynamic state. Therefore, as soon as friction discs begin to slip relative to the reaction plates (which occurs when the cutting wheel hits an immoveable object), the torque to which downstream components are subjected is immediately reduced by up to forty percent. In addition, the friction discs are oil cooled, and have semi-circular grooves in each phase for increased cooling.

The amount of compression to which the friction discs are subjected is determined by a fluid activated piston which acts upon the friction discs and their associated reaction plates. As the fluid pressure in the piston chamber is increased, the piston applies more force thereby increasing friction. This pressure is monitored and adjusted by the operator by a system of controls in the cab.

A novel system is provided which includes controls for monitoring, adjusting and releasing pressure on the piston. One of these controls is a pedal valve by which the operator of the trencher can quickly disengage the friction discs from the reaction plates by relieving all presure on the piston. The system also includes a pressure differential switch which senses a drop in pressure across a pedal valve. The switch opens a solenoid valve which vents the hydraulic pumps which move the tracks of the trencher in the forward direction. In essence, this puts the tracks of the trencher into a neutral gear and releases the forward pressure on the cutting wheel. In operation, this causes the trencher to "step back", releasing the cutting wheel from the obstruction. This is done instantaneously when the operator depresses the pedal valve fully. To restart the cutting wheel, the operator slowly releases the pedal valve which starts the wheel rotating again. This also pressurizes the track pumps so that forward motion of the trencher is also started. Significant here is that the entire operation by which the friction discs and reaction plates are released, forward motion of the trencher stopped, the trencher moved backwards so as to clear the obstruction, the wheel restarted, and the trencher again placed in forward motion, are all accomplished without the operator having to move the crowd handles, or readjust the ultimate setting of the piston pressure.

These improvements provide for better and longer service of the trencher. Indeed, the prototype of this improved trencher has been subjected to more than six months of heavy usage in the field without a single equipment failure. This alone is truly remarkable. Moreover, trenching speed is also improved.

It is, therefore, the object of this invention to provide an improved trenching device.

DESCRIPTION OF THE FIGURES

FIG. 3 is a schematic of the control system by which the torsion limiting devise is monitored, adjusted and released and by which the tracks of the trencher are neutralized.

DESCRIPTION OF THE PREFERRED EMBODIMENT

Figure 1:
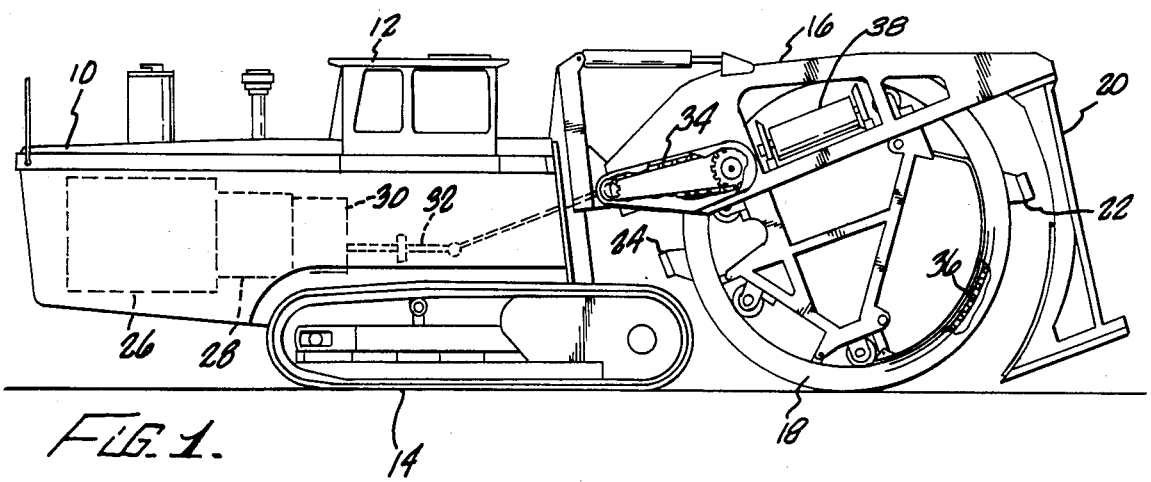
FIG. 1 is a side view of a typical trencher.

The preferred trencher will have an engine compartment 10, an enclosed cab 12, a track system 14, and a hydraulically adjusted boom assembly 16, to which the cutting wheel 18 and the rider shoe 20 are attached. The cutting wheel 18 is equipped with a number of buckets 22 around its outer periphery. Each of the buckets 22 has several cutting teeth 24 at the leading edge thereof.

The power plant 26 housed within engine compartment 10 should be of sufficient power output to turn the track system 14, the cutting wheel 18 and the conveyor belt 38. Power plants available from Caterpillar, such as its unit 3408TA, or smaller, depending upon the size of the trencher, have proven reliable. Similarly, standard Caterpillar unit 988 has proven reliable as transmission 28. Anterior of transmission 28 is the torsional limiting device 30 which will be described in detail infra. The power output from device 30 is attached to drive train 32. The drive train 32 turns the sprocket and chain assembly 34 which in turn drives a sprocket wheel (not shown) which engages the rim gear 36 on the interior periphery of cutting wheel 18. It should be noted that all components downstream of the device 30 are positive drive allowing for no slippage whatsoever. As will be discussed in greater detail, all protection for the equipment is provided by device 30.

As cutting wheel 18 is rotated, and the boom assembly 16 is lowered into trenching position, the cutting teeth 24 on the buckets 22 contact the ground and cause the material encountered to be cut or crumbled into the buckets 22. As the buckets 22 rotate from the 11 o'clock position to the 12 o'clock position, the contents of the buckets, through gravity, are dumped onto moving conveyor belt 38 which transport them to the side of the trencher where they are deposited on the ground next to the trench.

Figure 2:
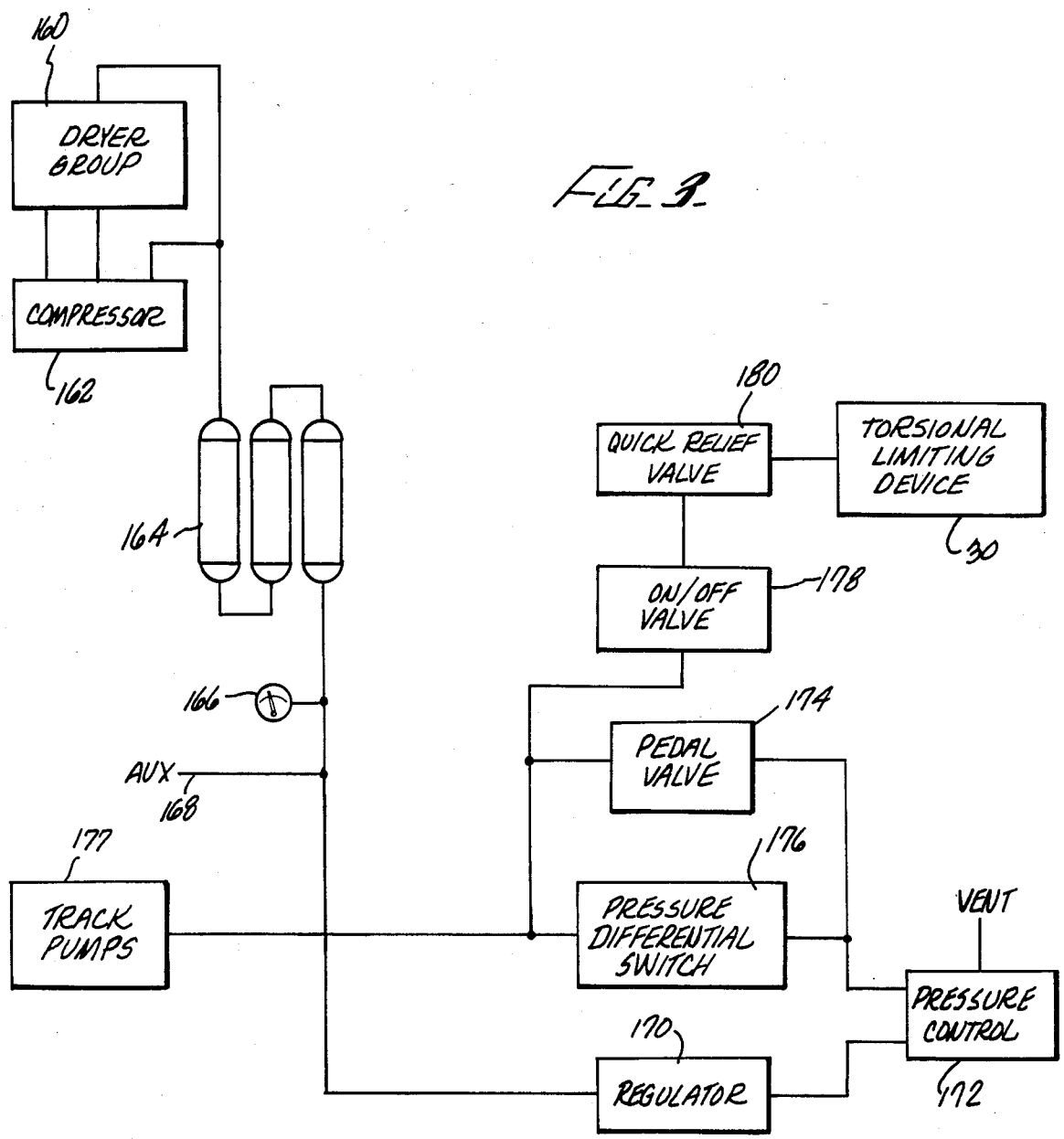
FIG. 2 is a cross-sectional view of the torsional limiting device. To show greater detail, this figure has been bifurcated along the device's center line, with the upper portion being shown in FIG. 2A, the lower portion being shown in FIG. 2B.
Figure 2B:
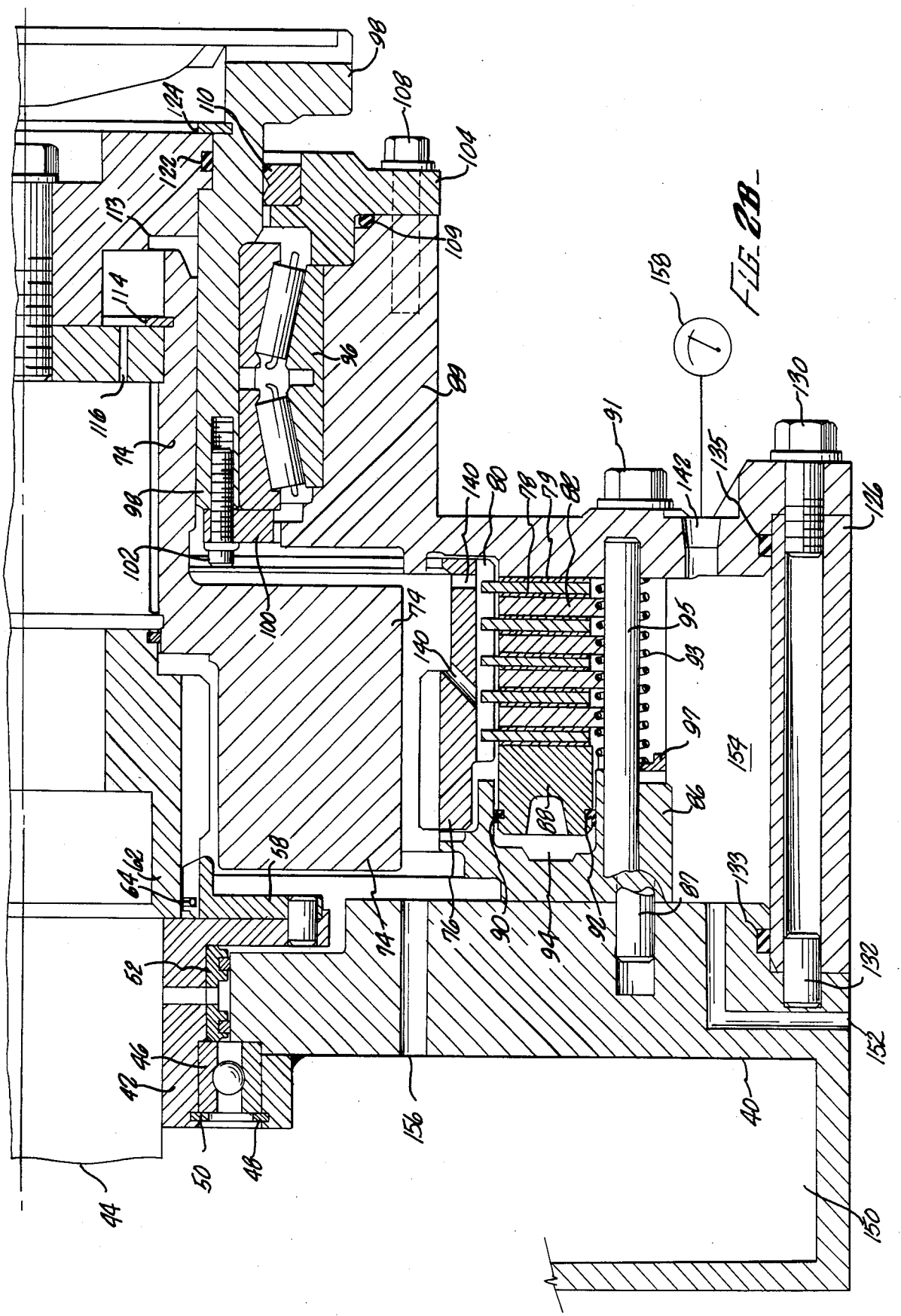

Looking at FIGS. 2A and B, the interior workings of device 30 are shown in detail. FIG. 2A is the top half, FIG. 2B is the bottom half, as FIG. 2 has been bifurcated along the center line of the device 30 in order to show greater detail.

In the preferred embodiment, device 30 has been adapted for use on standard Caterpillar transmission 988 and the adaptor housing 40 has been designed and constructed for that purpose. It should be understood, however, that this device 30 could be adapted for use with any transmission, with the adaptor housing 40 being modified to accommodate same.

A drive flange 42 is splined to the drive shaft 44 which exits from the transmission 28. Ball bearing assembly 46, which is retained in position by snap rings 48 and 50, is provided for centering and friction reduction. A carrier ring/ring seal assembly 52 surrounds drive flange 42 to seal against leakage of lubricating fluid. The ball bearing assembly 46 and the carrier ring/ring seal assembly 52 are secured by dowels 54 and 56, respectively.

Hub coupling 58 is attached to drive flange 42 by means of dowel pins 60. Bolts (not shown) are also used at spaced intervals around the periphery of the coupling. Hub coupling 58 engages the exterior gear teeth on sun gear 62. Snap ring 64 holds sun gear 62 in position on hub coupling 58.

The sun gear 62, in turn, engages planet gear 66 which rotates on bearings 68 on shaft 70, between discs 72, all of which is carried on planet carrier 74. Pin 71 holds shaft 70 in place; and internal ports 73 provide for interior lubrication of bearing 68 and discs 72. The planet gear 66 in turn engages ring gear 76 which has gear teeth about its interior periphery and is externally splined.

A series of friction discs 78 are slidably splined to ring gear 76 and which are attached perpendicularly to the direction of travel of ring gear 76. Placed in between each adjacent pair of disc plates 78 is a reaction plate 82. In this embodiment, there are five friction discs 78, and correspondingly, four reaction plates 82 interposed therebetween. Reaction plates 82 are slidably keyed to dowel pins 95 on piston housing 86. Piston housing 86 is attached to the adapter housing 40 by dowel pins 87, and is attached to rear cover plate by means of bolts 91.

Figure 4:
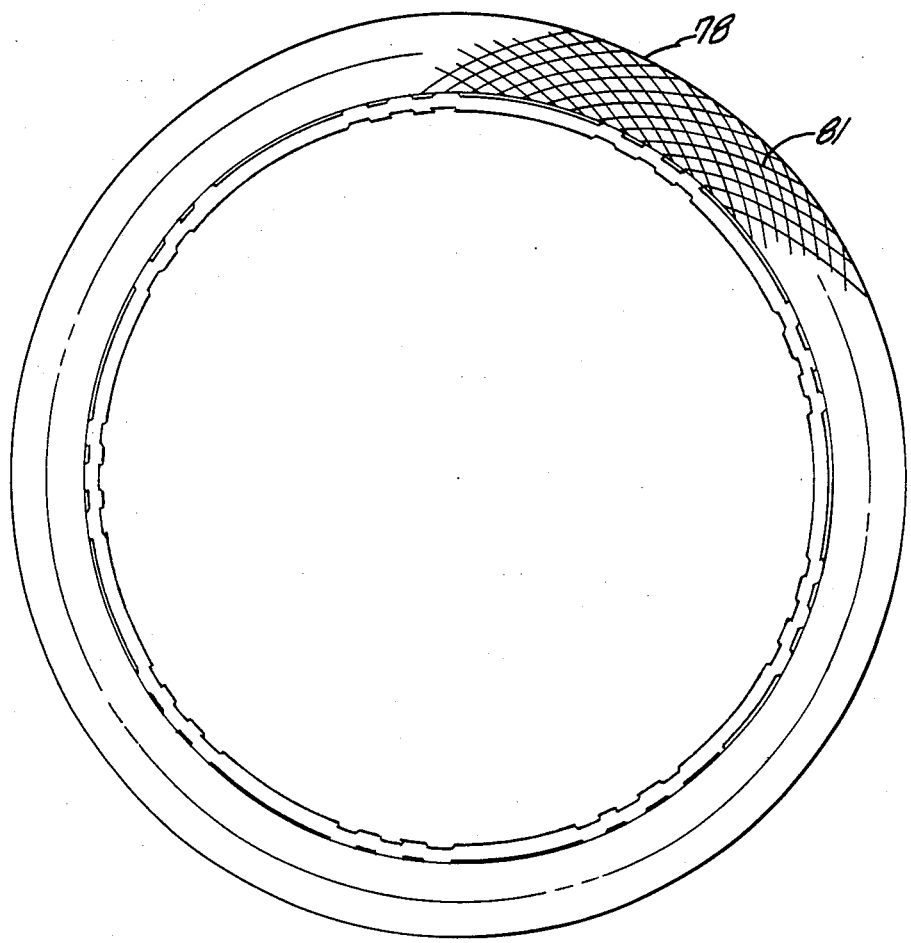
FIG. 4 is a side view of one of the friction discs in the torsional limiting device.
Figure 5:
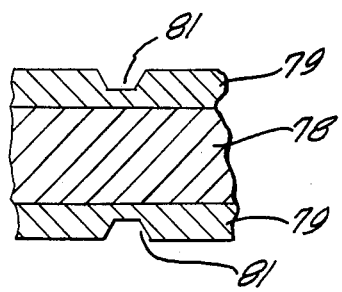
FIG. 5 is a cross section of one of the discs.

Each friction disc 78 comprises an inner-ring to which friction material 79 is attached on either side thereof. The friction material used has a higher coefficient of friction in the static state than in the dynamic state, so that when the discs 78 begin to move relative to reaction plates 82, the friction between them reduces. Caterpillar has produced a special disc for this purpose. It has been assigned Special Caterpillar Part No. 9W2152. As seen in FIGS. 4 and 5, the friction material 79 has grooves 81 formed in both faces thereof. The grooves 81 radiate from the interior edge to the exterior edge of the disc in a criss-cross fashion. These grooves 81 provide passageways between discs 78 and reaction plates 82 for the cooling fluid.

Piston 88, which resides in piston housing 86, is responsive to fluid pressure administered through port 81. In the preferred embodiment, pneumatic pressure is used. A pair of ring seals 90 and 92 abut against piston chamber 94 in piston housing 86 to prevent pressure loss. Piston 88 is biased away from the friction discs 78 by means of springs 93, which is inserted between dowel pins 95, and at one end abuts and acts upon spring plate 97 which is part of piston 88, and at its other end, abuts and acts upon rear cover plate 89. One end of dowel pin 95 resides within an appropriately-sized aperture in piston housing 86; the other end in an appropriately sized aperture in cover plate 89. Dowel pins 95 are inserted through a hole in spring plate 97.

As the pressure administered through port 81 is increased in piston chamber 94, springs 93 is overcome and piston 88 is forced against the pack of friction discs 78 and reaction plates 82, increasing the friction therebetween. At some point, the friction will become sufficiently great to overcome the inertia of the system such that the rotational movement of the friction discs 78 (and hence ring gear 76) will be stopped. As a result, the rotation of sun gear 62, acting upon planet gear 66, will now cause planet carrier 74 to rotate, whereas before, it was stationary as the rotation of sun gear 62 was communicated directly to ring gear 76.

Conversely, when the pressure is "backed off" on piston 88 to a sufficient degree, spring 93 will push piston 88 back and the friction between reaction plates 82 and the friction discs 78 will reduce to the point where the ring gear 76 will again start to rotate, allowing the planet carrier 74 to stop. Similarly, when the load applied to planet carrier 74 increases to the point where it overcomes the friction between reaction plates 82 and friction discs 78, ring gear 76 will begin to rotate, allowing planet carrier 74 to stop so that the increased load is not communicated to the planet gear 66, sun gear 62 or drive shaft 44.

Rotation of the planet carrier 74 is delivered exteriorly of device 30 via end yoke 98 to which carrier 74 is splined. End yoke 98, and hence planet carrier 74, are journalled on roller bearing assembly 96, which is held in position at one end by plate 100 attached to end yoke 98 by means of bolt 102, and at the other end by retainer plate 104, which is attached to the rear cover 89 by means of bolt 108. O-ring 109 seals against fluid leakage between retainer plate 104 and rear cover 89. A large ring seal 110 resides within an appropriately sized groove in retainer plate 104 to provide sealing contact against end yoke 98 to prevent fluid leakage. A capture plate 112 is held in place in the interior cavity of planet carrier 74 by means of snap ring 114. Spline lubrication hole 116 is provided in capture plate 112. A slot 113 is provided in end cap 118 for communicating lubrication oil to end yoke 98 and planet carrier 74. An end cap 118 is attached to capture plate 112 by means of bolt 120. An O-ring seal 122 resides within an appropriately sized groove in end cap 118 to seal against end yoke 98 to preclude fluid drainage. A snap ring 124 also assists in keeping the capture plate 112 and end cap 118 in position. End yoke 98 is available for linkage to the drive train 32.

The device 30 is completed by outer housing 126 which is attached between the adapter housing 40 and the cover plate 89 by means of bolts 128 and 130, and dowel pins 132. Interior ports 140 are provided for communication of lubrication fluid throughout the device 30. A cooling oil pressure port 142 is provided in rear cover 89 near the bottom of the mechanism and guage 158 is attached thereto.

The device 30, and specifically the friction discs 78 and reaction plates 82 are oil cooled. A pump (not shown) is powered off of engine 26. The pump transports oil from the lubrication reservoir 150 and presents it through port 152 into chamber 154. This oil is forced between friction discs 78 and reaction plates 82 through grooves 81 and is returned to tank 150 through port 156. As the friction material 79 is worn off friction discs 78, the grooves 81 decrease in size, resulting in increased pressure in chamber 154. This pressure is recorded on gauge 158. It has been found that when the pressure on gauge 158 reads 30 psi, replacement of the friction material 79 is needed.

The system for supplying, controlling, adjusting and releasing the pressure acting on piston 88 in device 30 and neutralizing the tracks 14 of the trencher is shown schematically in FIG. 3.

Air is pressurized via compressor 162, dried by drier 160, and stored in tanks 164. A gauge for the system pressure 166 is located in cab 12 for monitoring by the operator of the trencher. An auxillary system 168 can be provided.

The pressurized air from the tanks 164 is delivered to the device 30 through a series of controls which allow the operator of the trencher to precisely adjust the amount of friction between the friction discs 78 and reaction plates 82. First, a safety pressure regulator 170 is provided to insure that no more pressure than can be safely utilized at piston 88 is presented to chamber 94, and hence, to prevent excessive torque from being transmitted to downstream components. From there, the air passes through a pressure regulating control unit 172 which is located in the cab 12. Pressure control unit 172 can be manually adjusted by the operator to set the maximum pressure the operator wants delivered to piston 88, but only up to the maximum allowed by regulator 170. From there, the air pressure is routed through a pedal valve 174, which is located on the floor section in cab 12, much like the clutch in a standard transmission automobile. Pedal valve 174 allows the operator to "feather" the pressure being delivered to the piston 88. A pressure differential switch 176 monitors the pressure fore and aft of the pedal valve 174, and is set to trigger a solenoid valve which in turn vents the track pumps 177 which has the effect of stopping the forward motion of the tracks, essentially putting the tracks in "neutral". The pumps are again pressurized when the pedal valve 174 is released. A clutch on/off valve 178 and a quick release valve 180 are also provided in cab 12 for the operator.

It has been found that a minimum system pressure of 150 pounds per square inch is desirable. Under most working conditions, the regulator 170 should be set at 90 psi approximately, with the pressure control unit 172 set at 80 psi maximum. The pressure differential switch 176 should be set to trigger at a 30 psi differential.

With this system, the maximum pressure applied to piston 88, and hence to the tensioning of device 30, can be controlled, monitored and adjusted minutely and easily by the operator from the enclosed cab 12 of the trencher. The pedal valve 174 provides the operator with the ability to instantaneously feather the pressure. In the event the cutting wheel 18 encounters an immovable object, the operator can immediately release all pressure on piston 88 by depressing pedal valve 174 completely, or triggering clutch on/off valve 178 and subsequently the quick release valve 180.

Typically, when the pedal valve 174 is depressed, the resultant immediate interruption of power to the cutting wheel and neutralizing of the tracks causes the trencher to "step" backwards. This slight backward movement is usually sufficient to allow the cutting wheel 18 to be rotated again and the obstruction attacked cleanly, which in most cases is sufficient to clear the obstruction. Therefore, there is very little disruption in the forward trenching progress, so the trenching operation continues virtually uninterrupted, and the operator does not have to readjust the pressure on piston 88 or the setting of the crowd handles.

The use of this invention has resulted in a tremendous reduction in down time as the prototypes of this device have been subjected to rigorous field tests equating over six months normal usage in the most difficult of geological formations without a single major equipment failure. With prior art devices, failures often occurred once a week.

Although a precise description of the preferred embodiment is set forth above, it will be understood to those in the art that many modifications thereupon are possible, without departing from the inventive concepts hereinafter claimed. Accordingly, this patent and the protection provided hereby is not to be limited to the preferred embodiment, but is of the full scope of each of the appended claims.

What is claimed is:

1. In a trenching apparatus comprising a vehicle having a power train comprising at least an engine, transmission and power output shaft from said transmission; a motive system for moving the vehicle; an adjustable boom assembly attached to said vehicle; a cutting wheel rotatably attached to said boom assembly; and drive means connecting said cutting wheel to said power train for causing said cutting wheel to rotate; the improvement comprising a torsional limiting device connected between said power train and said drive means, said device comprising:
  (a) a planetary ring gear assembly having a sun gear journaled in said device, a planet gear rotatable on a planet carrier journaled in said device, said planet gear rotatable on said planet carrier, interposed between and in geared relationship with said sun gear and a ring gear which is journaled in said device, said sun gear attached to said power output shaft from said transmission and said planet carrier attached to said drive means;
  (b) a plurality of friction discs moveably keyed to said ring gear such that rotation of said ring gear causes said friction discs to rotate;
  (c) a plurality of reaction plates moveably keyed to said device, each said reaction plate being sandwiched between two said friction discs; and
  (d) piston means attached to said device for forcing said friction disc and reaction plates together under force.

2. The invention of claim 1 wherein said piston means comprises a fluid driven piston housed in a piston chamber in said device which acts upon said friction discs and said reaction plates to increase or decrease friction therebetween, and means for introducing fluid pressure into said piston chamber.

3. The invention of claim 2 further comprising control means for accurately setting, conveniently adjusting and immediately releasing the fluid pressure applied to said piston, said means comprising a fluid pressure control device attached to the trenching apparatus for regulating the fluid pressure in said piston chamber and a release value attached to the trencher for relieving the fluid pressure in said piston chamber.

4. The invention of claim 3 wherein said fluid pressure control device comprises a pedal valve attached to the trenching apparatus within close reach of the operator of the apparatus; said pedal valve operable to instantaneously and minutely vary the pressure acting upon said piston.

5. The invention of claim 1 wherein said friction discs are coated with a friction material at least on the sides thereof adjacent to said reaction plates, said material having a coefficient of friction which is less in the dynamic state than it is in a static state.

6. The invention of claim 5 wherein said device further comprises an internal oil reservoir and means for communicating said oil to said friction discs to cool them.

7. The invention of claim 6 wherein grooves are formed in said friction discs in the sides thereof adjacent said reaction plates for allowing said cooling oil to pass therethrough.

8. The invention of claim 3 wherein said control means further includes means attached to the trencher for neutralizing the motive system of the vehicle when the pressure applied to said piston is reduced to a predetermined amount.

9. An improved trencher comprising:
  (a) a vehicle having an engine, a transmission attached aft of said engine, said transmission having a drive shaft extending exteriorly therefrom, and a track drive, powered by said engine, operable to move said vehicle;
  (b) torsional limiting means attached aft of said transmission for limiting the amount of power which can be communicated downstream thereof, and for protecting downstream components, said means comprising:
    (i) a housing attached to said transmission;
    (ii) a drive flange attached to said transmission drive shaft and journalled within said housing;
    (iii) a sun gear attached to said drive flange;
    (iv) a planet gear attached to a planet carrier and geared to said sun gear such that rotation of said sun gear causes said planet gear to rotate on said planet carrier when said planet carrier is stationary, said planet carrier journalled in said housing;
    (v) a ring gear having interior gear teeth which engage said planet gear, and exterior splines to which are slidably attached a plurality of friction discs;
    (vi) the plurality of reaction plates interposed between said friction discs and slidably attached to said housing;
    (vii) an end-yoke splined to said planet carrier and extending exteriorly of said housing;
    (viii) a piston and piston chamber in said housing, said piston positioned such that increased pressure in said piston chamber causes said piston to impart a greater force on said friction discs and said reaction plates, increasing the friction therebetween; and
    (ix) means formed in said housing for introducing fluid pressure to said piston chamber;
  (c) a boom assembly attached to said vehicle, said boom assembly capable of being raised and lowered relative to said vehicle;
  (d) a cutting wheel rotatably attached to said boom assembly; and
  (e) a drive train between said cutting wheel and said torsional limiting means such that power output from said torsional limiting means is communicated to said cutting wheel, causing it to rotate.

10. An improved trencher comprising:
 (a) a vehicle having an engine and a motive system for moving the vehicle;
 (b) a boom assembly adjustably attached to said vehicle;
 (c) a cutting wheel rotatably attached to said boom assembly;
 (d) a drive train between said engine and said cutting wheel for communicating power output from the engine to said cutting wheel, causing said cutting wheel to rotate;
 (e) torsional limiting means in said drive train for limiting the amount of torque delivered from said engine to said cutting wheel, and for protecting the drive train downstream of said torsional limiting means in the event the said cutting wheel is stopped unexpectedly; and
 (f) means attached to the trencher for simultaneously disconnecting said drive means between said engine and said cutting wheel and neturalizing said motive system.

* * * * *